US009137115B2

(12) United States Patent
Mayfield et al.

(10) Patent No.: US 9,137,115 B2
(45) Date of Patent: Sep. 15, 2015

(54) SYSTEM AND METHOD FOR RESOURCE RECONCILIATION IN AN ENTERPRISE MANAGEMENT SYSTEM

(75) Inventors: Richard Mayfield, Pleasanton, CA (US); Douglas Mueller, Palo Alto, CA (US); Narayan Kumar, Santa Clara, CA (US)

(73) Assignee: BMC SOFTWARE, INC., Houston, TX (US)

( * ) Notice: Subject to any disclaimer, the term of this patent is extended or adjusted under 35 U.S.C. 154(b) by 1036 days.

(21) Appl. No.: 11/204,189

(22) Filed: Aug. 15, 2005

(65) Prior Publication Data
US 2006/0136585 A1 Jun. 22, 2006

Related U.S. Application Data

(60) Provisional application No. 60/633,640, filed on Dec. 6, 2004.

(51) Int. Cl.
*H04L 12/751* (2013.01)
*G06F 7/14* (2006.01)
*H04L 12/24* (2006.01)
*G06F 7/20* (2006.01)
*G06F 7/36* (2006.01)
*G06Q 10/06* (2012.01)

(52) U.S. Cl.
CPC *H04L 41/12* (2013.01); *G06F 7/14* (2013.01); *G06F 7/20* (2013.01); *G06F 7/36* (2013.01); *G06Q 10/06* (2013.01); *H04L 41/0813* (2013.01); *H04L 41/0233* (2013.01); *H04L 41/0893* (2013.01)

(58) Field of Classification Search
CPC .............. G06F 7/14; G06F 7/16; G06F 7/20; G06F 7/32; G06F 7/36; H04L 41/12; H04L 41/885
USPC ...................... 709/223–226; 707/1–10, 104.1
See application file for complete search history.

(56) References Cited

U.S. PATENT DOCUMENTS

| 5,761,505 A | 6/1998 | Golson et al. |
| 5,948,055 A | 9/1999 | Pulsipher et al. |
| 5,991,877 A | 11/1999 | Luckenbaugh |
| 6,041,058 A | 3/2000 | Flanders et al. |
| 6,212,266 B1 | 4/2001 | Busuioc |
| 6,266,513 B1 | 7/2001 | Briancon |
| 6,286,047 B1 | 9/2001 | Ramanathan et al. |

(Continued)

OTHER PUBLICATIONS

European Search Report dated Apr. 3, 2006.

(Continued)

*Primary Examiner* — Aaron Strange

(57) ABSTRACT

A method to reconcile multiple instances of a single computer resource identified by resource discovery operations includes: (1) accessing information describing one or more resources; (2) identifying, via the accessed information, at least one resource that has been detected or discovered by at least two of the discovery operations; and (3) merging attributes associated with the identified resource from each of the at least two discovery operations into a single, reconciled resource object. Illustrative "resources" include, but are not limited to, computer systems, components of computer systems, data storage systems, switches, routers, memory, software applications (e.g., accounting and database applications), operating systems and business services (e.g., order entry or change management and tracking services).

20 Claims, 7 Drawing Sheets

(56) References Cited

U.S. PATENT DOCUMENTS

| | | | |
|---|---|---|---|
| 6,336,138 B1 | 1/2002 | Caswell et al. | |
| 6,496,838 B1 | 12/2002 | Zamora-McKelvy et al. | |
| 6,820,090 B2 * | 11/2004 | Chambers et al. | 707/101 |
| 6,836,798 B1 | 12/2004 | Adams | |
| 7,003,402 B2 * | 2/2006 | Christie et al. | 702/14 |
| 7,082,426 B2 * | 7/2006 | Musgrove et al. | 707/3 |
| 7,146,380 B2 * | 12/2006 | Schaepe et al. | 707/103 X |
| 7,155,427 B1 * | 12/2006 | Prothia et al. | 707/3 |
| 7,380,025 B1 | 5/2008 | Riggins et al. | |
| 7,395,256 B2 * | 7/2008 | Ji et al. | 707/3 |
| 8,683,032 B2 | 3/2014 | Spinelli et al. | |
| 2002/0002555 A1 * | 1/2002 | Wolman et al. | 707/101 |
| 2002/0009085 A1 | 1/2002 | Barkai et al. | |
| 2002/0143935 A1 | 10/2002 | Schenkel et al. | |
| 2002/0184529 A1 | 12/2002 | Foster et al. | |
| 2003/0058813 A1 | 3/2003 | Viola et al. | |
| 2003/0126108 A1 * | 7/2003 | Martino et al. | 707/1 |
| 2004/0019672 A1 * | 1/2004 | Das et al. | 709/223 |
| 2004/0025157 A1 | 2/2004 | Blight et al. | |
| 2004/0143600 A1 * | 7/2004 | Musgrove et al. | 707/104.1 |
| 2004/0146008 A1 | 7/2004 | Conradt et al. | |
| 2004/0220963 A1 * | 11/2004 | Chen et al. | 707/103 R |
| 2004/0264435 A1 | 12/2004 | Chari et al. | |
| 2005/0038889 A1 | 2/2005 | Frietsch et al. | |
| 2005/0080613 A1 * | 4/2005 | Colledge et al. | 704/9 |
| 2005/0216433 A1 * | 9/2005 | Bland et al. | 707/1 |
| 2005/0234973 A1 * | 10/2005 | Zeng et al. | 707/103 R |
| 2006/0059253 A1 | 3/2006 | Goodman et al. | |
| 2006/0064481 A1 | 3/2006 | Baron et al. | |
| 2006/0069801 A1 | 3/2006 | Rich et al. | |
| 2006/0080656 A1 | 4/2006 | Cain et al. | |
| 2006/0106590 A1 | 5/2006 | Tseng et al. | |
| 2006/0123104 A1 | 6/2006 | Spinelli et al. | |
| 2006/0123393 A1 | 6/2006 | Atkins et al. | |
| 2006/0136585 A1 | 6/2006 | Mayfield et al. | |
| 2006/0179124 A1 | 8/2006 | Stefaniak et al. | |
| 2006/0271341 A1 | 11/2006 | Brown et al. | |
| 2007/0239700 A1 | 10/2007 | Ramachandran | |
| 2008/0021917 A1 | 1/2008 | Baker et al. | |
| 2008/0183724 A1 | 7/2008 | Mueller | |
| 2008/0301081 A1 | 12/2008 | Karnik et al. | |
| 2009/0094462 A1 | 4/2009 | Madduri | |
| 2009/0319932 A1 | 12/2009 | Robinson et al. | |
| 2010/0161577 A1 | 6/2010 | Morozov | |
| 2011/0238637 A1 | 9/2011 | Morozov et al. | |
| 2012/0259812 A1 | 10/2012 | Rangarajan et al. | |
| 2013/0007011 A1 | 1/2013 | Setlur et al. | |
| 2014/0143416 A1 | 5/2014 | Spinelli et al. | |
| 2014/0195504 A1 | 7/2014 | Morozov et al. | |
| 2014/0279992 A1 | 9/2014 | Morozov | |

OTHER PUBLICATIONS

"The Four Challenges of Customer-Centric Data Warehousing." Carleton Corporation. Nov. 1998. 16 pages.

"BMC Atrium Core 7.6.00; Concepts and Planning Guide", (Sep. 2009), 1-164 pages.

"BMC Atrium Core 7.6.00; Normalization and Reconciliation Guide", (Sep. 2009), 1-148 pages.

"BMC Atrium Core 7.6.00; User's Guide", (Sep. 2009), 1-78 pages.

Notice of Allowance for U.S. Appl. No. 11/295,363, mailed Nov. 4, 2013, 23 pages.

Notice of Allowance for U.S. Appl. No. 12/860,334, mailed Dec. 17, 2013, 13 pages.

Non-Final Office Action for U.S. Appl. No. 11/295,363, mailed Apr. 3, 2013, 23 pages.

Extended European Search Report received for European Patent Application No. 05257483.7, mailed on Mar. 31, 2006, 7 pages.

Non-Final Office Action received for U.S. Appl. No. 13/082,194, mailed on Aug. 13, 2014, 28 pages.

Response to Non Final Office Action filed for U.S. Appl. No. 13/082,194, filed on Nov. 12, 2014, 13 pages.

Final Office Action received for U.S. Appl. No. 13/082,194, mailed on Dec. 1, 2014, 27 pages.

Non-Final Office Action received for U.S. Appl. No. 13/804,694, mailed on Jan. 15, 2015, 23 pages.

* cited by examiner

ILLUSTRATIVE IDENTIFICATION RULE SCREEN IMAGE

ILLUSTRATIVE IDENTIFICATION GROUP SCREEN IMAGE

SYSTEM AND METHOD FOR RESOURCE RECONCILIATION IN AN ENTERPRISE MANAGEMENT SYSTEM

CROSS-REFERENCE TO RELATED APPLICATION

This application claims priority to U.S. provisional patent application entitled "Change Configuration Management," filed 6 Dec. 2004, assigned Ser. No. 60/633,640 and which is hereby incorporated by reference.

COMPUTER PROGRAM LISTING APPENDIX

A computer program listing appendix has been submitted in accordance with 37 C.F.R. 1.96(c), 1.77(b)(4) and 1.52(e). The afore-mentioned computer program listing appendix comprises a single compact disk having stored thereon the following files: "schema.txt" (created 15 Jul. 2005 having 3,762,902 bytes); and "api.txt" (created 15 Jul. 2005 having 62,157 bytes). File schema.txt is an ASCII text file comprising concatenated source code files that, collectively, specify an illustrative class schema in accordance with one embodiment of the invention (see, for example, element 215 in FIG. 2). File api.txt is an ASCII text file describing a reconciliation engine to database application programming interface in accordance with one embodiment of the invention (see, for example, element 220 in FIG. 2). The source code listings provided as part of the computer program listing appendix contain material which is subject to copyright protection. The copyright owner (BMC Software, Inc.) has no objection to the facsimile reproduction by anyone of the patent document or the patent disclosure as it appears in the Patent and Trademark Office file or records, but other wise reserves all copyright rights whatsoever. The source code listings provided as part of the computer program listing appendix are hereby incorporated by reference.

BACKGROUND

The invention relates generally to enterprise management systems and more particularly to the reconciliation of objects (representing resources) input to the management system from different sources.

Today's businesses rely on a myriad of complex software applications to service customers or clients as well as to manage internal operations. Many of these applications require an extensive set of information technology ("IT") components, some unique and some shared with other applications. It will be appreciated that in an enterprise environment in which an organization's network (or interconnected networks) can span diverse geographical locations and include a number of different computational platforms, operating systems, protocols, and network architectures, it is becoming more and more important to know what resources are available so that they may be used most efficiently in supporting the businesses needs. In addition, regulations such as Sarbanes-Oxley are putting pressure on businesses to accurately discover, track and report what resources they own, who has access to them, and the change history around those systems and software. As used herein, the term "resource" includes, but is not limited to, computer systems, components of computer systems, data storage systems, switches, routers, memory, software applications (e.g., accounting and database applications), operating systems and business services (e.g., order entry or change management and tracking services).

In large computing environments or enterprises, multiple applications may be used to "discover" or detect resources comprising, or available for use by or within, the computing environment. In such situations, a single resource may have been discovered and reported to an enterprise's configuration management system multiple times. Thus, it would be beneficial to provide a mechanism to identify and reconcile the discovery of IT resources from multiple sources. Only with this capability can an enterprise's resources be effectively managed.

SUMMARY

In one embodiment the invention provides a method to reconcile computer resources identified by resource discovery operations. The method includes accessing information describing one or more resources obtained from a plurality of discovery sources; identifying, via the accessed information, at least one resource that has been detected or discovered by at least two of the discovery sources; and merging the attribute values associated with the resource (from each of the discovery sources that detected the resource) into a reconciled resource object. The method may be stored in any media that is readable and executable by a computer system. In addition, methods in accordance with the invention may be executed by one or more processing units comprising a computer system.

DETAILED DESCRIPTION

Techniques to reconcile the detection of computational resources (e.g., hardware, software and services) from a number of different sources are described. The following embodiments of the invention, described in terms of a change configuration management system, are illustrative only and are not to be considered limiting in any respect.

Figure 1:
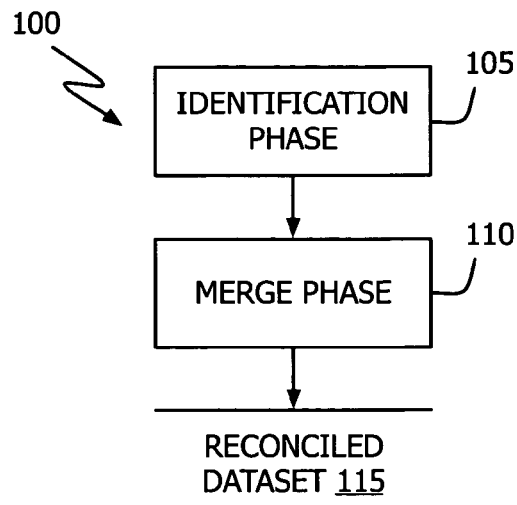
FIG. 1 shows, in flowchart form, a reconciliation process in accordance with the invention.

Referring to FIG. 1, reconciliation process 100 in accordance with the invention includes identification phase 105 and merge phase 110, generating reconciled dataset 115. During identification phase 105 resources are detected through, for example, automated and/or manual discovery operations. Illustrative discovery operations include those provided by the Discovery Express and PATROL® Visualis products from BMC Software, Inc. (PATROL is a registered trademark of BMC Software, Inc. of Houston, Tex.) Illustrative resources include computer systems, computer system components, data storage systems, switches, routers, memory, software applications (e.g., accounting and database applications), operating systems and business services (e.g., order entry or change management and tracking services). It will be recognized that in a typical software embodiment, each detected resource may be represented as an object (a software entity) that includes one or more attributes. For example, a computer system resource may be represented by a computer system object whose attributes include, among others, "Name," "IP Number" and "Operating System." Identification phase 105 also analyzes detected resources to determine if they were previously identified and reconciled or whether they are a newly detected resource. During merge phase 110, the data associated with resource objects (e.g., a resource objects' attributes) identified as being different instances of a common resource are combined into a single or reconciled resource object. This reconciled resource object is pushed into (i.e., associated with) reconciled dataset 115. (Unitary identified resource objects may also be moved into reconciled dataset 115.)

Figure 2:
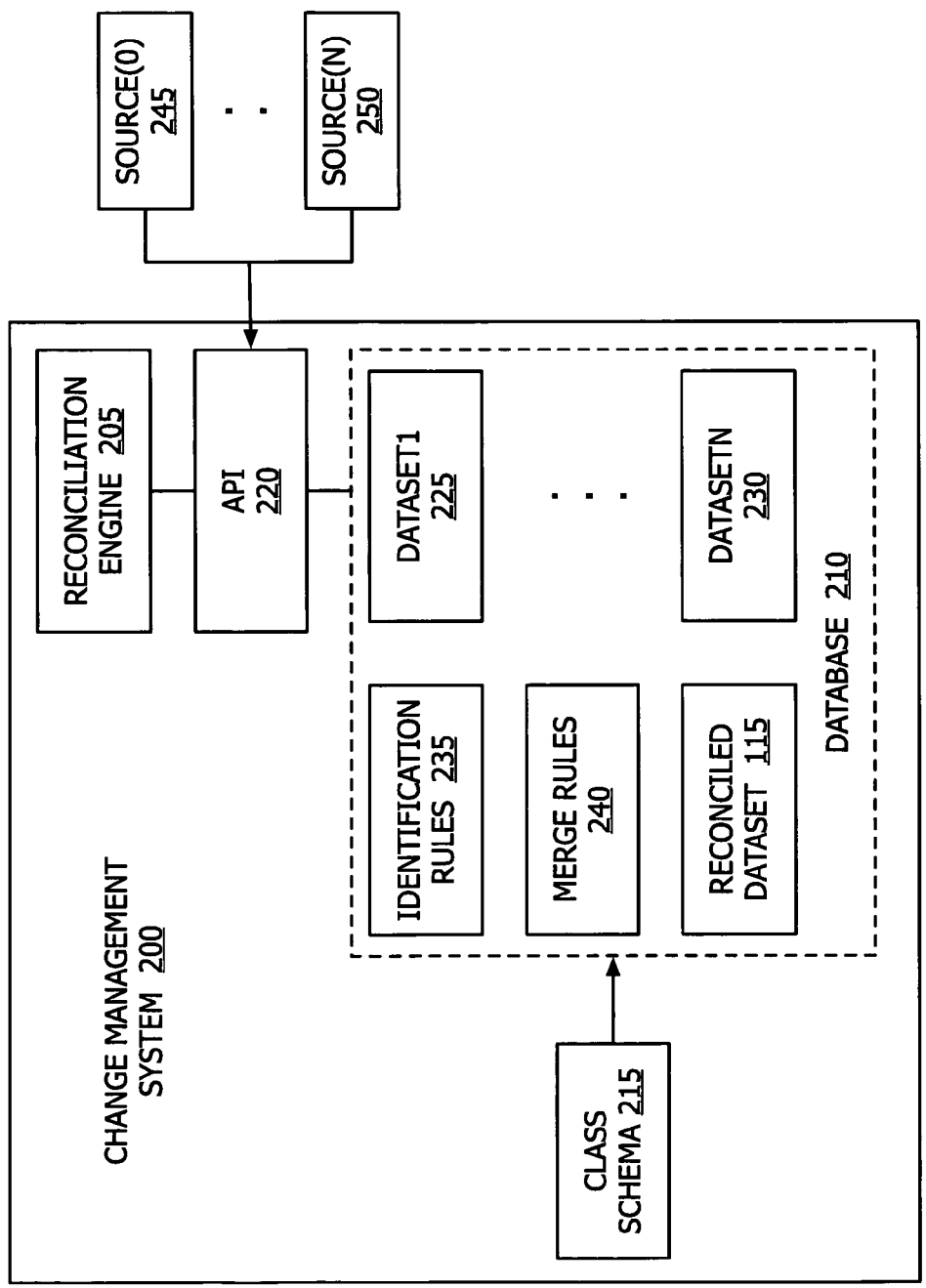
FIG. 2 shows, in block diagram form, one aspect of a change management system in accordance with one embodiment of the invention.

Referring to FIG. 2, illustrative change management system 200 includes reconciliation engine 205, database 210, class schema 215 and database application programming interface ("API") 220. Reconciliation engine 205 utilizes reconciliation process 100 in accordance with the invention. Database 210 provides, inter alia, for the storage of information related to discovered and identified resources (datasets 225 through 230), reconciled resources (reconciled dataset 115) and the rules or policies by which reconciliation engine 205 performs the acts of identifying (identification rules 235) and merging (merge rules 240). Class schema 215 defines the resource object hierarchy which reconciliation engine 205 and, in fact, change management system 200 operates. That is, class schema 215 defines the types and attributes that a resource object may have. For example, while each resource discovery source (e.g., 245 or 250) may use its own scheme for representing detected resources, each source must supply its information to change management system 200 (through API 220) in accordance with class schema 215. In one embodiment, database 210 comprises a configuration management database ("CMDB") in accordance with the Information Technology Infrastructure Library ("ITIL") standard. (See, http://www.ogc.gov.uk/index.asp?id=2261 for ITIL information.) An illustrative class schema is described in source code format in a computer program listing appendix. As will be discussed in further detail below, in addition to defining what attributes any given type of resource includes, class schema 215 defines an object identifier ("Object_ID") and reconciliation identifier ("Reconciliation_ID") attribute for each object type. Accordingly, every instance of a resource object stored in database 210 includes an Object_ID and a Reconciliation_ID attribute value. It will be recognized that one potential Object_ID or Reconciliation_ID value is a NULL value—such value indicating the resource object has not been identified and/or reconciled (e.g., a newly created an unreconciled object may have Object_ID and/or Reconciliation_ID values of zero, "0"). Database API 220 provides a mechanism by which entities such as reconciliation engine 205 and resource discovery sources 245 through 250 retrieve information from and/or store information into database 210 (e.g., datasets 225-230). An illustrative application programming interface ('API') is provided in source code format in a computer program listing appendix.

Figure 3B:
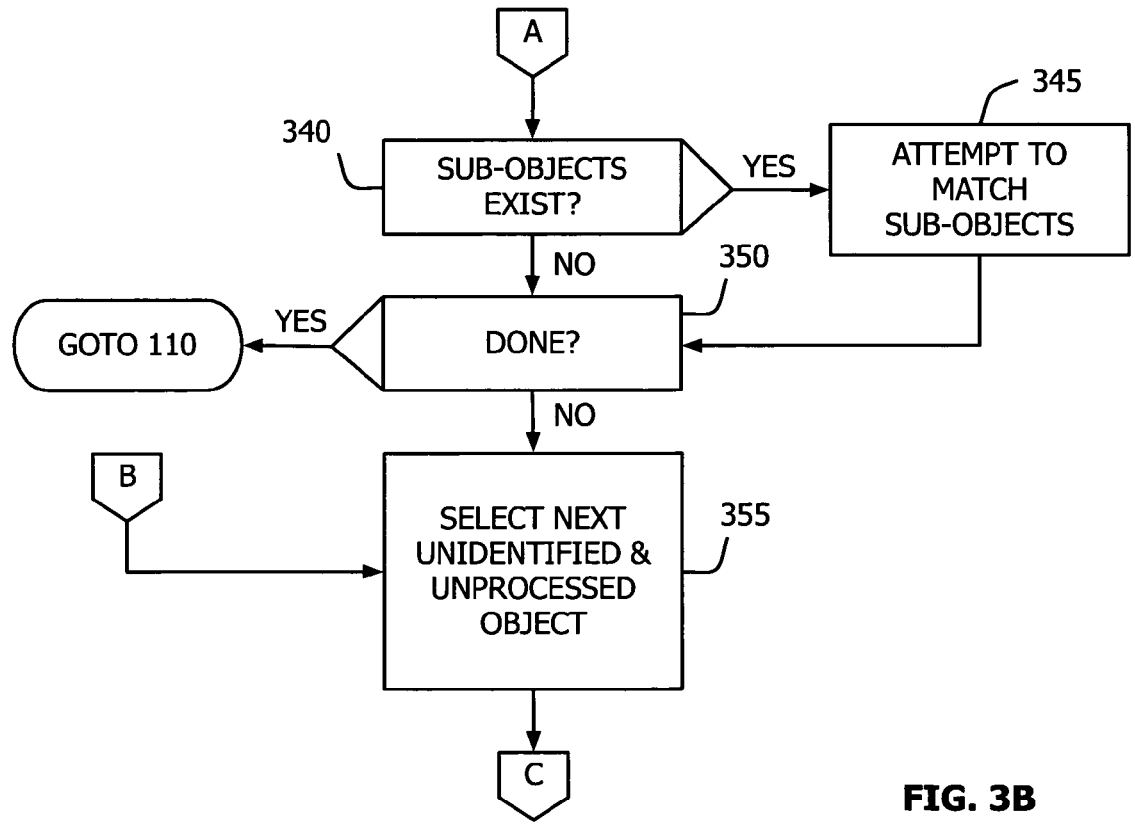
FIGS. 3A and 3B show, in flowchart form, an identification phase operation in accordance with one embodiment of the invention.
Figure 3A:
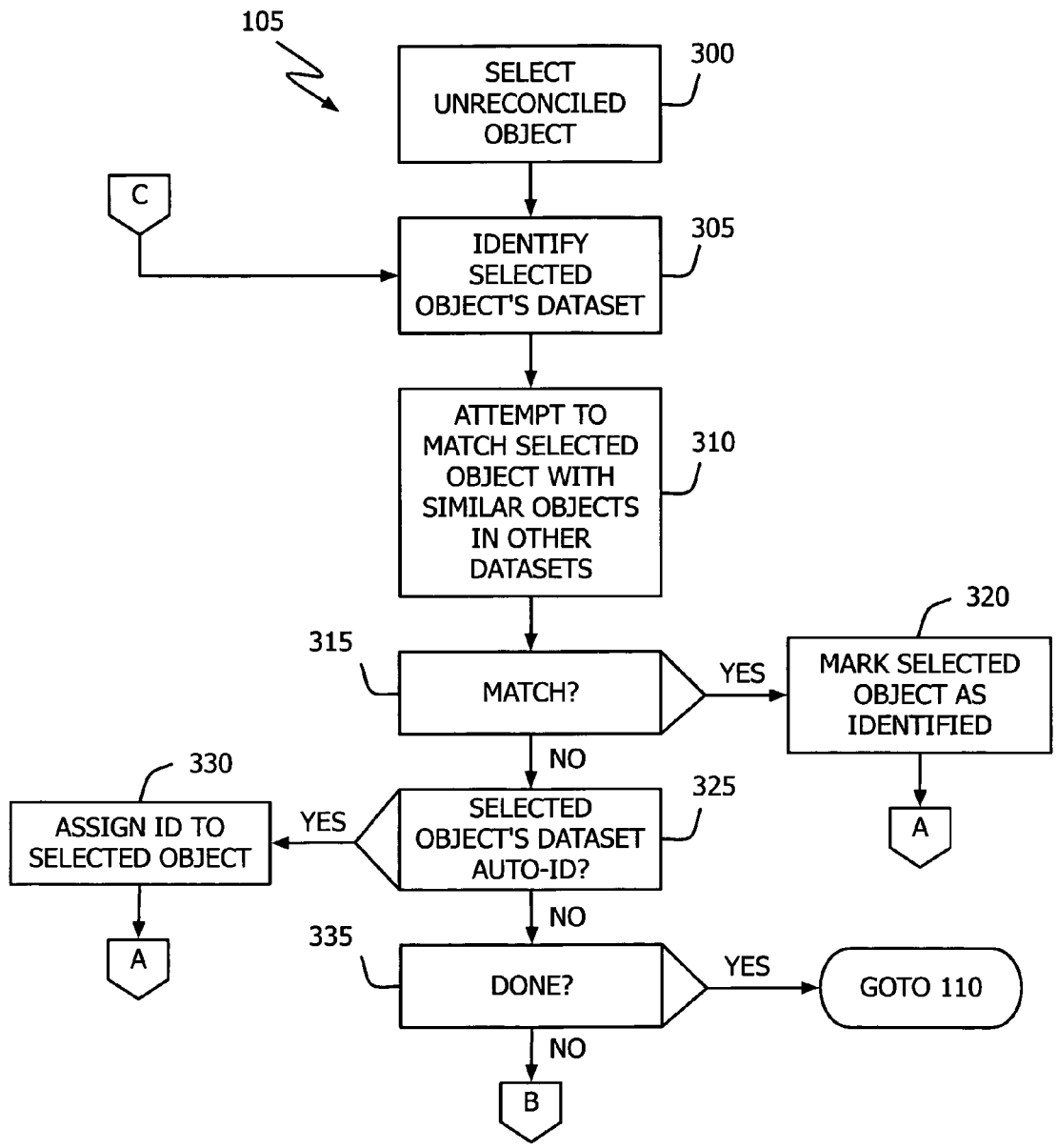

One embodiment of identification phase 105 is shown in detail in FIGS. 3A and 3B. Referring to FIG. 3A, a first unreconciled resource object is selected from all of the unreconciled resource objects supplied by discovery sources 245-250 to database 210 and stored in, for example, datasets 225-230 (block 300). After identifying the dataset associated with the resource object and, therefore, the source that detected the resource (block 305), an attempt is made to match the selected resource object with similar objects (in accordance with class schema 215) in other datasets that have already been identified and reconciled (block 310).

Figure 4:
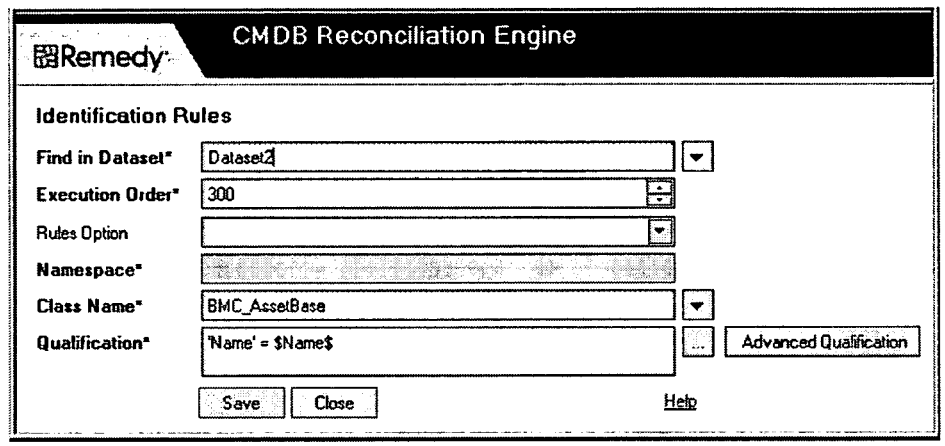
FIG. 4 shows a screen image of an identification rule dialog box in accordance with one embodiment of the invention.
Figure 5:
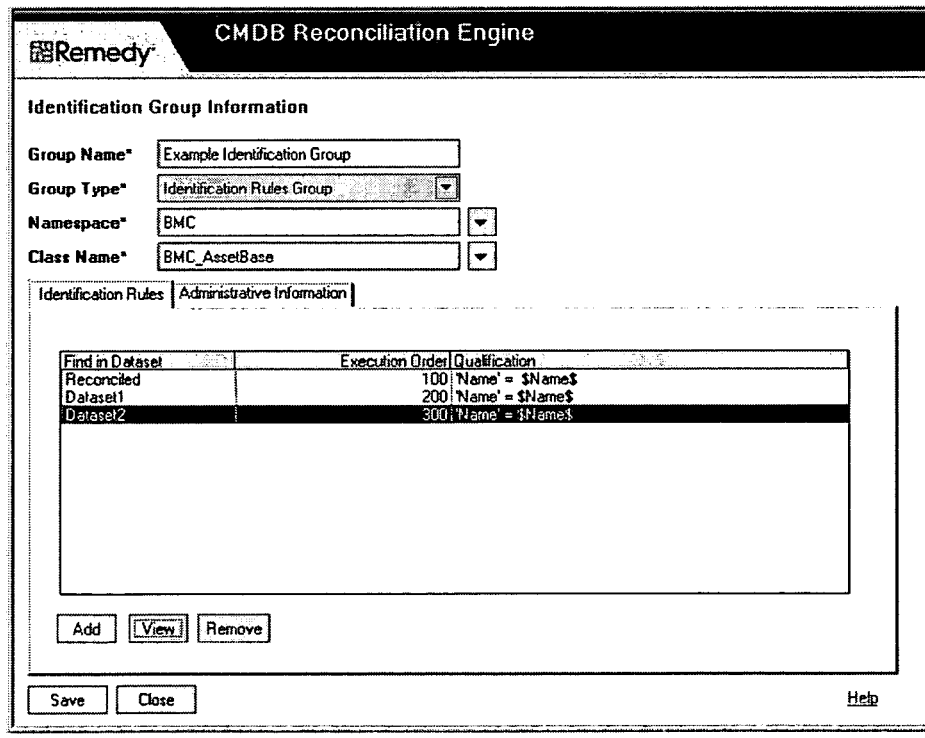
FIG. 5 shows a screen image of an identification group dialog box in accordance with one embodiment of the invention.

Generally, reconciliation engine 205 uses identification rules 235 to drive the match process. In one embodiment, identification rules 235 are organized into identification groups, with each rule specifying what attributes should be considered when determining a match, the type of object to be matched and the discovery source or dataset to which the rule applies. Identification groups may contain any number of rules and, in addition, may be ordered such that individual rules within a group are processed in a given order. For example, if Dataset1 represents the bulk of discovered resources and Dataset2 contains relatively few instances, it is more likely that an unidentified object will find a match in Dataset1. As such, Dataset1 may be listed (and processed) before Dataset2 in the identification group. Alternatively, if Dataset2 represents resources discovered by a particularly robust or accurate discovery process, it may be searched first. FIG. 4 shows a screen-shot image of an identification rule dialog box in accordance with one embodiment of the invention. FIG. 5 shows a screen-shot image of an identification group dialog box in accordance with one embodiment of the invention. Table 1 provides a textual description of the illustrative identification group shown in FIG. 5.

TABLE 1

Explanation of Illustrative Identification Group of FIG. 5

| Find in Dataset . . . | Matching Qualification | Description |
|---|---|---|
| Reconciled | 'Name' = $Name$ | Look for a match in the reconciled dataset. A match is where the values of the 'Name' attribute of the unidentified resource object instance match that of the reconciled dataset's instance. |
| Dataset1 | 'Name' = $Name$ | Next, look for a match in the Dataset1 dataset. |
| Dataset2 | 'Name' = $Name$ | Finally, look for a match in the Dataset2 dataset. |

It will be recognized that class schema 215 (see FIG. 2) defines an object hierarchy to which inheritance applies. As shown in FIGS. 4 and 5, identification rules and identification groups are associated with a dataset for a given class of object. Since reconciliation engine 205 is aware of class schema 215, rules may be applied to instances of a class' sub-classes. That is, the same identification rule may be applied to unidentified instances whose class derives from the class associated with the rule specified in the identification rule. In one embodiment, this 'rule inheritance' feature may be the default mechanism for processing rules during identification phase 105. In another embodiment, rule inheritance may not be used. In still another embodiment, rule inheritance may be turned on, or off, by a user on a per-class basis.

Referring again to FIG. 3A, if the object selected in accordance with block 300 is determined to match a prior identified resource object (the "YES" prong of block 315), it is marked as identified (block 320). In one embodiment, the act of "marking an object as identified" comprises assigning the object's Reconciliation_ID attribute value with that value assigned to the resource object which was used to identify it.

Referring now FIG. 3B, a test is then made to determine if the newly identified object includes or comprises sub-objects (block 340). For example, if the identified object is a computer system object, it may include monitor, keyboard, pointing device, processor, memory or storage media sub-objects. Further, a sub-object (e.g., a storage resource object) may itself include sub-objects (e.g., disk drive, CD ROM, tape unit and floppy disk objects). If the newly identified object contains unidentified sub-objects (the "YES" prong of block 340), an attempt to identify each sub-object is made (block 345); such identification proceeding as described with respect to blocks 310-320. If the newly identified object has no sub-objects (the "NO" prong of block 340) or identification in accordance with block 345 is complete, a check is made to determine if additional unidentified objects remain to be processed (block 350). If no more objects remain to be processed (the "YES" prong of block 350), merge phase 110 is initiated. If more objects remain to be processed (the "NO" prong of block 350), the next unidentified and unprocessed object is selected (block 355) and processing continues at block 305.

Referring once again to FIG. 3A, if the object selected in accordance with block 300 is determined not to match a prior identified resource object (the "NO" prong of block 315), a check is made to determine if the selected object is associated with an "auto-identify" dataset. In the embodiment described in FIGS. 3A and 3B, one or more datasets may be designated as auto-identify datasets via the identification rules (see discussion above). Reconciliation engine 205 assigns a unique Reconciliation_ID to each resource object instance in an auto-identify dataset if the following conditions are satisfied: (1) at least one of the identification rules associated with the object searches in the reconciliation phase's master dataset for a match; and (2) the identification rules fail to find a match. In general, the "master" dataset is that dataset that is the target of the reconciliation process 100—e.g., reconciled dataset 115. If the selected object is from a dataset designated as auto-identify (the "YES" prong of block 325), it is assigned unique object and reconciliation identifier values (block 330), whereafter processing continues at block 340 as described above. If the selected object is not from a dataset designated as auto-identify (the "NO" prong of block 325), a check is made to determine if additional objects remain to be identified. If no more objects remain to be processed (the "YES" prong of block 335), merge phase 110 is initiated. If more objects remain to be processed (the "NO" prong of block 335), processing continues at block 355 as described above.

It will be recognized that if after identification phase 105 one or more resource object instances remain unidentified, it may be necessary to either refine the identification rules or perform a match manually through, for example, a user interface. In one embodiment of a manual identification operation, the user could be presented with a list of unidentified resource object instances and a list of identified resource object instances. The user could then select an unidentified resource object instance, perform searches to refine the candidate list of identified instances, select an identified resource object instance, and apply the identity (e.g., the Reconciliation_ID attribute value of the unidentified resource object instance would be set to the value of the Reconciliation_ID attribute of the identified resource object instance).

Figure 6:
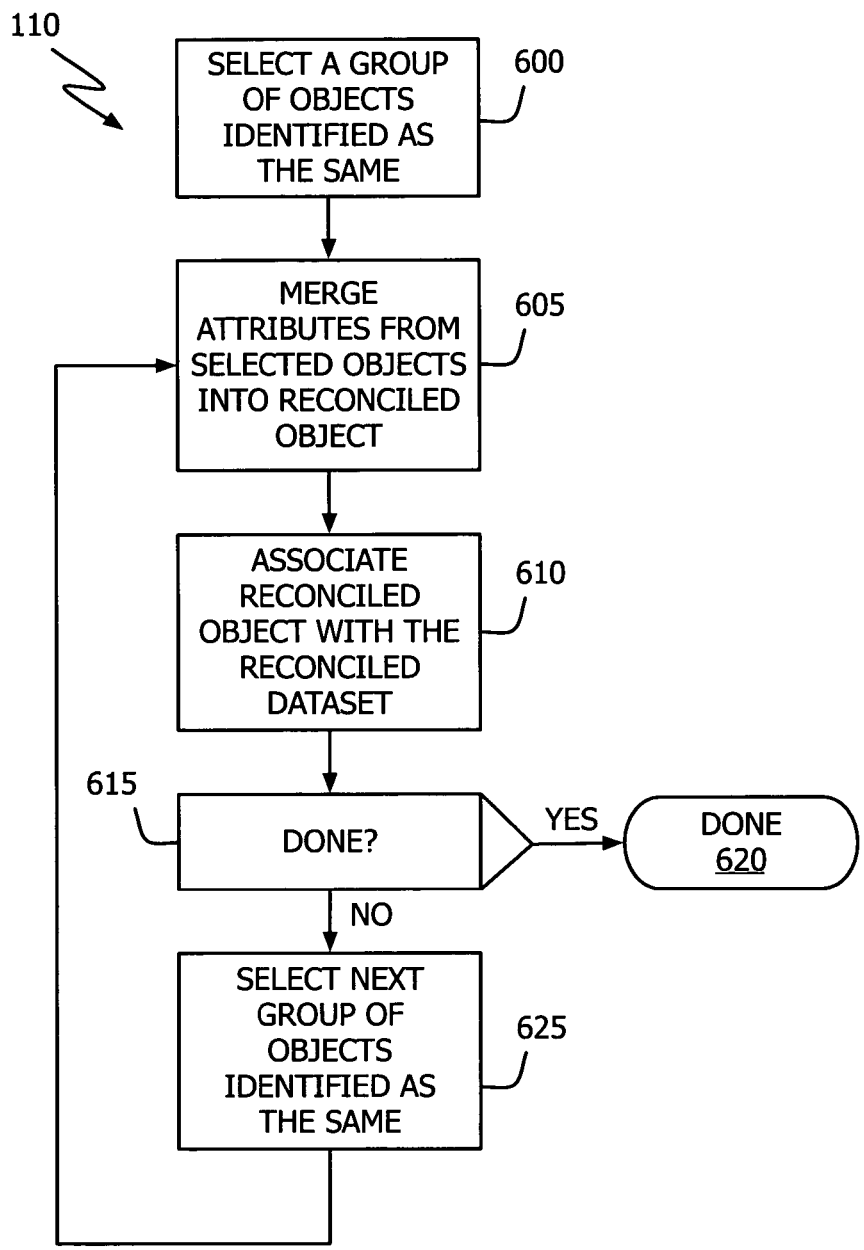
FIG. 6 shows, in flowchart form, a merge phase operation in accordance with one embodiment of the invention.

In the embodiments described herein, merge phase 110 pulls together resource object instances from different datasets that, thru identification phase 105, have been assigned the same Reconciliation_ID attribute value and either modifies or creates an instance of the resource object in a resulting dataset (e.g., reconciled dataset 215). One particular embodiment of merge phase 110 is shown in detail in FIG. 6. To begin, a first group of objects determined (during identification phase 105) to be different instances of a single resource are selected (block 600). For example, in the embodiment described above this would be all identified objects having a common Reconciliation_ID attribute value. Attributes associated with each of the selected objects are then merged into a single, reconciled, resource object (block 605) which is then associated (if it is not already) with reconciled dataset 215 (block 610). If no additional objects remain to be processed (the "YES" prong of block 615), reconciliation process 100 is complete (block 620). If, however, additional objects remain to be processed (the "NO" prong of block 615), the next group of unreconciled objects are selected (block 625) and processing continues in accordance with block 605.

Figure 7:
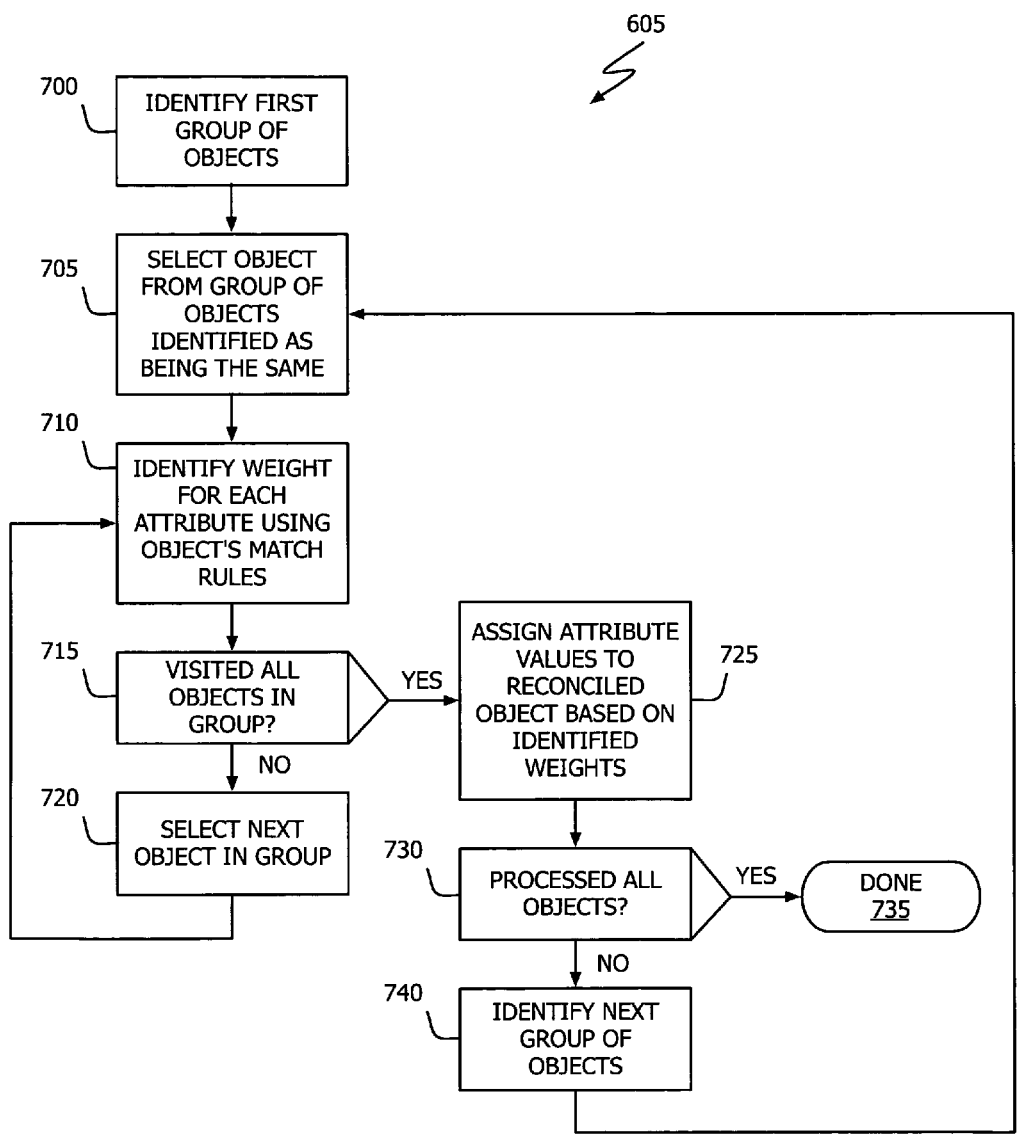
FIG. 7 shows, in flowchart form, an attribute value merge operation in accordance with one embodiment of the invention.

In one embodiment, the attribute merge operation of block 605 is shown in FIG. 7. A group of one or more resource objects is identified for processing, where each member of the group was assigned the same reconciliation identifier value during identification phase 105 (block 700). From the selected group a first resource object is selected (block 705). A weight is then assigned to each of the identified resource object's attributes in accordance with merge rules 240 (block 710). Until all of the resource objects within the currently identified group have had weights assigned to their attributes (the "NO" prong of block 715), the next object within the group is selected (block 720) whereafter processing continues at block 710. Once all attributes for each of the resource objects in the identified group have been assigned a weight (the "YES" prong of block 715), that attribute value (for each defined attribute associated with the resource object) having the largest weight is selected and assigned to the corresponding attribute in the reconciled data object (block 725). For example, if there are N resource objects in the selected group there could be up to N values for each attribute associated with the object. In the embodiment described herein, that attribute value assigned the largest weight during the acts of block (710) would be selected and assigned to the corresponding attribute in the reconciled data object. If all identified objects have been processed (the "YES" prong of block 730), merge phase 110 is complete (block 735). If, however, additional identified objects remain to be processed (the "NO" prong of block 730), the next group of resource objects is identified (block 740) and processing continues at block 705. It will be recognized that, although merge operation 605 has been described as "assigning" weights, in practice this may not actually occur. For example, it has been found convenient to "assign" weights through rules (that is, weights are associated with rules—see discussion below) that are evaluated during merge operation 605. In this context, weights are not assigned, but rather evaluated during merge operation 605, with the object having the highest evaluated weight being selected.

Figure 8:
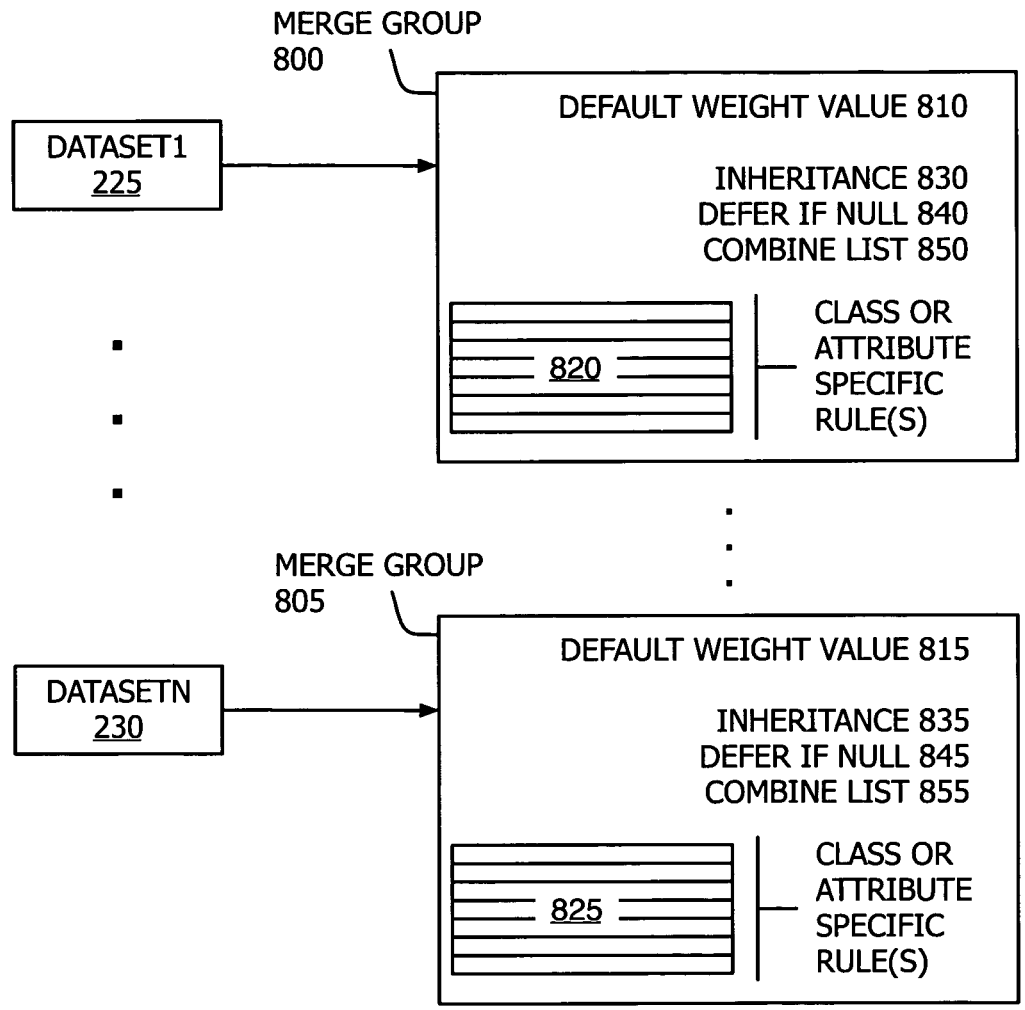
FIG. 8 shows the functional structure of a merge group in accordance with one embodiment of the invention.

Reconciliation engine 205 uses merge rules 240 to assign a weight value to each attribute for each resource object reconciled in accordance with FIG. 7. Referring to FIG. 8, in one embodiment merge rules are organized into merge groups (e.g., 800 and 805), each merge group being associated with a single dataset (e.g., Dataset1 225 and DatasetN 230). As shown, each merge group can include a default weight value (e.g., 810 and 815), zero or more class or attribute specific rules (e.g., 820 and 825), an "Inheritance" flag (e.g., 830 and 835), a "Defer if Null" indicator (e.g., 840 and 845) and an attribute value combination designator (e.g., 850 and 855).

With respect to default weight value 810 (815), this is the weight value assigned to each attribute of each object in associated dataset 225 (230) if no class or attribute specific rule 820 (825) exists to override it. Class or attribute specific rules 820 (825) can be put in place to override any default value. For example, a class specific rule could stipulate that all resource objects of a given type (e.g., a computer system resource object or storage media resource object) be assigned a specified value. Similarly, an attribute specific rule could stipulate that one or more attributes in a designated object class be assigned a specified value. Class or attribute specific rules 820 and 825 may include no rules or any combination of one or more class or attribute specific rules.

In one embodiment of the invention, weight values are assigned to specific resource objects' attributes during the acts of block 710 in accordance with the algorithm shown in Table 2.

TABLE 2

Illustrative Attribute Weight Assignment Algorithm

IF an attribute-specific merge rule is defined for the attribute,
   Use the weight value specified by the rule;
ELSE IF a class-specific merge rule is defined for the class to which the attribute's associated instance belongs,
   Use the weight value specified by the rule;
ELSE IF a class-specific merge rule is defined for a super-class to which the attribute's associated instance belongs,
   Use the weight value specified by the rule;
ELSE use the default weight value associated with the merge group.

With respect to a merge group's inheritance flag (e.g., 830 and 835), class and attribute specific merge rules (e.g., 820 and 825) may be made to apply in accordance with the inheritance properties of the data objects to which they are associated. For example, if a merge group's inheritance flag is set to "Yes" (or some functionally equivalent value), the weight assigned to any given attribute will be that weight that accounts for, or incorporates, the inheritance of the attribute's associated object class. By way of example, consider the case where objects of type ClassA and ClassB are defined in class schema 215, ClassB objects being a subclass of ClassA objects. Further, let ClassA objects include attributes A1 and A2 and ClassB objects include an attribute A3. If the relevant merge group includes class specific rules that specify a weight value of 200 for all attributes from objects of ClassA and a weight value of 600 for all attributes from objects of ClassB, then the attributes for an instance of ClassB would have the following weight values: A1=200; A2=200; and A3=600. If, on the other hand, the merge group's inheritance flag is set to "No" (or some functionally equivalent value), and the merge group's default weight value was 100, the attributes for an instance of ClassB would have the following weight values: A1=100; A2=100; and A3=600.

With respect to a merge group's defer if null indicator (e.g., 840 and 845), this parameter allows a user to specify what action to take when an attribute of an instance of a resource object has a "null" or "no" value. The defer if null indicator allows the user to defer to the dataset with the next weight for a given attribute if the highest weighted value is "null." This allows a user to basically say, "I'd rather have some value than no value at all, even if the source isn't the highest weighted." For example, if the relevant merge group's defer if null indicator is set to "True" (or some functionally equivalent value), the dataset with the next weight for a given attribute value is checked: if it's defer if null value is "False" (or some functionally equivalent value), the attribute's value is assigned; if its value is also null, then the next value is checked and so on, until all the datasets have been checked. If no mating value is detected, the attribute may be assigned a null or "nothing" value.

With respect to a merge group's attribute value combination designator (e.g., 850 and 855), this parameter allows a user to assign more than one value to an attribute of a reconciled object. For example, if the relevant merge group's attribute value combination designation is set to "Yes" (or some functionally equivalent value), the attribute values for each instance in a group may be combined (e.g., concatenated with individual values separated by a semicolon or comma) with the resulting list being assigned to the corresponding attribute value in the reconciled object. If the relevant merge group's attribute value combination designation is set to "No" (or some functionally equivalent value), the value assigned to the reconciled object's attribute is that value associated with the highest weight as described above.

Various changes in the details in the components and illustrated operational methods are possible without departing from the scope of the following claims. For instance, database 210 may be embodied as a distributed or federated database. In addition, identification rules 235 may use more than a single attribute to perform a match (see FIGS. 4 and 5 and Table 1). For example, an identification rule could be based on a combination of attributes such as name, name format (e.g., WINS, DNS or IP), revision number and the like. Further, merge phase 110 may use an attribute value selection algorithm other than that described in Table 2. For example, a reconciled object's attribute value could be the algebraic average, weighted average or median of the values from all detected resource objects. Also, database 210 could include more than a single reconciled dataset. In addition, acts in accordance with FIGS. 1, 3A, 3B, 6 and 7 may be performed by a programmable control device executing instructions organized into one or more program modules. A programmable control device may be a single computer processor, a special purpose processor, a plurality of processors coupled by a communications link or a custom designed state machine. Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The preceding description has been presented to enable any person skilled in the art to make and use the invention as claimed and is provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

The invention claimed is:

1. A method for resource reconciliation, the method being performed by at least one processor, the method comprising:
selecting a first resource object from one of a plurality of datasets including a first dataset and a second dataset, each of the first dataset and the second dataset storing un-reconciled resource objects;
matching the first resource object with a second resource object stored in one of the plurality of datasets or a reconciled dataset storing reconciled resource objects according to at least one identification rule, wherein when the first dataset includes more resource objects than the second dataset and the reconciled dataset, the at least one identification rule indicates to search the first dataset for a match before searching the second dataset and the reconciled dataset;

merging the first resource object and the second resource object into a reconciled resource object; and storing the reconciled resource object in the reconciled dataset, wherein the merging including assigning a weight value to each attribute of the first resource object and each attribute of the second resource object, selecting an attribute among the attributes of the first resource object and the second resource object based on the weight values, and assigning an attribute value of the selected attribute to the reconciled resource object.

2. The method of claim 1, wherein the first resource object and the second resource object correspond to a hardware device.

3. The method of claim 1, wherein the first resource object and the second resource object correspond to a software entity.

4. The method of claim 1, wherein the matching further includes assigning a reconciliation identifier to the first resource object that is equivalent to the second resource object.

5. The method of claim 1, wherein the at least one identification rule specifies which attribute or attributes are considered when determining a match.

6. The method of claim 1, wherein the at least one identification rule includes a first identification rule providing matching criteria associated with a first class of resource objects and a second identification rule providing matching criteria associated with a second class of resource objects that is different than the matching criteria of the first identification rule, wherein the first resource object is matched with the second resource object according to the matching criteria of the first identification rule when the first resource object corresponds to the first class of resource objects, and the first resource object is matched with the second resource object according to the matching criteria of the second identification rule when the first resource object corresponds to the second class of resource objects.

7. The method of claim 1, wherein the merging includes merging resource objects having same reconciliation identifiers such that the attributes of the first resource object are merged with the attributes of the second resource object according to an attribute merge operation, wherein the merging merges the attributes of the first resource object and the attributes of the second resource object into a single reconciled resource object.

8. The method of claim 1, wherein the selecting includes selecting the attribute having a highest weight value.

9. A resource management computer system comprising:
a database configured to store a plurality of datasets including a first dataset and a second dataset, the first and second datasets storing un-reconciled resource objects, the database configured to store a reconciled dataset storing reconciled resource objects; and
a reconciliation engine configured to select a first resource object from the first dataset, match the first resource object with a second resource object stored in the first dataset, the second dataset, or the reconciled dataset according to at least one identification rule, wherein when the first dataset includes more resource objects than the second dataset and the reconciled dataset, the at least one identification rule indicates to search the first dataset for a match before searching the second dataset and the reconciled dataset,
the reconciliation engine configured to merge the first resource object and the second resource object within a reconciled resource object,
wherein the reconciliation engine is configured to assign a weight value to each attribute of the first resource object and each attribute of the second resource object, select an attribute among the attributes of the first resource object and the second resource object based on the weight values, and assign an attribute value of the selected attribute to the reconciled resource object.

10. The resource management computer system of claim 9, wherein the first resource object and the second resource object correspond to a software entity.

11. The resource management computer system of claim 9, wherein the reconciliation engine is configured to assign a reconciliation identifier to the first resource object that is equivalent to the second resource object.

12. The resource management computer system of claim 9, wherein the at least one identification rule specifies which attribute or attributes are considered when determining a match.

13. The resource management computer system of claim 9, wherein the at least one identification rule includes a first identification rule providing matching criteria associated with a first class of resource objects and a second identification rule providing matching criteria associated with a second class of resource objects that is different than the matching criteria of the first identification rule, wherein the first resource object is matched with the second resource object according to the matching criteria of the first identification rule when the first resource object corresponds to the first class of resource objects, and the first resource object is matched with the second resource object according to the matching criteria of the second identification rule when the first resource object corresponds to the second class of resource objects.

14. The resource management computer system of claim 9, wherein the reconciliation engine is configured to select the attribute having a highest weight value.

15. A non-transitory computer-readable medium storing instructions that when executed by at least one processor, are configured to cause the at least one processor to:
select a first resource object from one of a plurality of datasets including a first dataset and a second dataset, each of the first dataset and the second dataset storing un-reconciled resource objects;
match the first resource object with a second resource object stored in one of the plurality of datasets or a reconciled dataset storing reconciled resource objects according to at least one identification rule, wherein when the first dataset includes more resource objects than the second dataset and the reconciled dataset, the at least one identification rule indicates to search the first dataset for a match before searching the second dataset and the reconciled dataset;
merge the first resource object and the second resource object into a reconciled resource object, the first resource object and the second resource object being different instances of a common resource object; and
store the reconciled resource object in the reconciled dataset,
wherein the instructions are configured to assign a weight value to each attribute of the first resource object and each attribute of the second resource object, select an attribute among the attributes of the first resource object and the second resource object based on the weight values, and assign an attribute value of the selected attribute to the reconciled resource object.

16. The non-transitory computer-readable medium of claim 15, wherein the first resource object and the second resource object correspond to a software entity.

17. The non-transitory computer-readable medium of claim 15, wherein the instructions are configured to assign a reconciliation identifier to the first resource object that is equivalent to the second resource object.

18. The non-transitory computer-readable medium of claim 15, wherein the at least one identification rule specifies which attribute or attributes are considered when determining a match.

19. The non-transitory computer-readable medium of claim 15, wherein the at least one identification rule includes a first identification rule providing matching criteria associated with a first class of resource objects and a second identification rule providing matching criteria associated with a second class of resource objects that is different than the matching criteria of the first identification rule, wherein the first resource object is matched with the second resource object according to the matching criteria of the first identification rule when the first resource object corresponds to the first class of resource objects, and the first resource object is matched with the second resource object according to the matching criteria of the second identification rule when the first resource object corresponds to the second class of resource objects.

20. The non-transitory computer-readable medium of claim 15, wherein the instructions are configured to select the attribute having a highest weight value.

* * * * *